(12) United States Patent
Doi

(10) Patent No.: US 7,706,217 B2
(45) Date of Patent: Apr. 27, 2010

(54) OPTICAL DISC APPARATUS

(75) Inventor: Akihiko Doi, Tokyo (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 900 days.

(21) Appl. No.: 11/464,076

(22) Filed: Aug. 11, 2006

(65) Prior Publication Data

US 2007/0076545 A1   Apr. 5, 2007

(30) Foreign Application Priority Data

Sep. 15, 2005   (JP)   ............................. 2005-269125

(51) Int. Cl.
G11B 7/09   (2006.01)
(52) U.S. Cl. ............... 369/44.26; 369/53.23; 369/53.34
(58) Field of Classification Search ... 369/44.25–44.31, 369/44.34–44.36, 44.41, 47.15–47.17, 47.23–47.24, 369/47.35, 53.2, 53.22–53.23, 53.31, 53.34, 369/59.13, 124.01, 124.08
See application file for complete search history.

(56) References Cited

U.S. PATENT DOCUMENTS 5,808,979 A * 9/1998 Ishibashi et al. ......... 369/44.35
6,317,396 B1   11/2001 Kuribayashi 2004/0228233 A1 * 11/2004 Hiratsuka ................ 369/44.28

FOREIGN PATENT DOCUMENTS

| EP | 1 677 292 A1 | 7/2006 |
|---|---|---|
| JP | 10-198981 | 7/1998 |
| JP | 2000-123378 | 4/2000 |
| JP | 2005-149704 | 6/2002 |
| JP | 2004-71143 | 3/2004 |
| JP | 2005-182927 | 7/2005 |

* cited by examiner

*Primary Examiner*—Andrea L Wellington
*Assistant Examiner*—Nathan Danielsen
(74) *Attorney, Agent, or Firm*—Oblon, Spivak, McClelland, Maier & Neustadt, L.L.P.

(57) ABSTRACT

An optical disc apparatus includes an emitter which emits a laser beam to a optical disc, a divided photodetector including a first divided portion and a second divided portion disposed in a light path of the reflected beam from the optical disc, and producing a first photodetector signal and a second photodetector signal, a phase difference detector which produces a phase difference signal from a phase difference between the first and the second photodetector signals, an integrator which produces a integral signal from a integration of the phase difference signal, a tracking controller configure to perform tracking control based on the integral signal, and a limiter which limits a signal to be supplied from the divided photodetector to the phase difference detector or a signal to be supplied from the phase difference detector to the integrator based on a detection status of a signal detected by the divided photodetector.

3 Claims, 3 Drawing Sheets

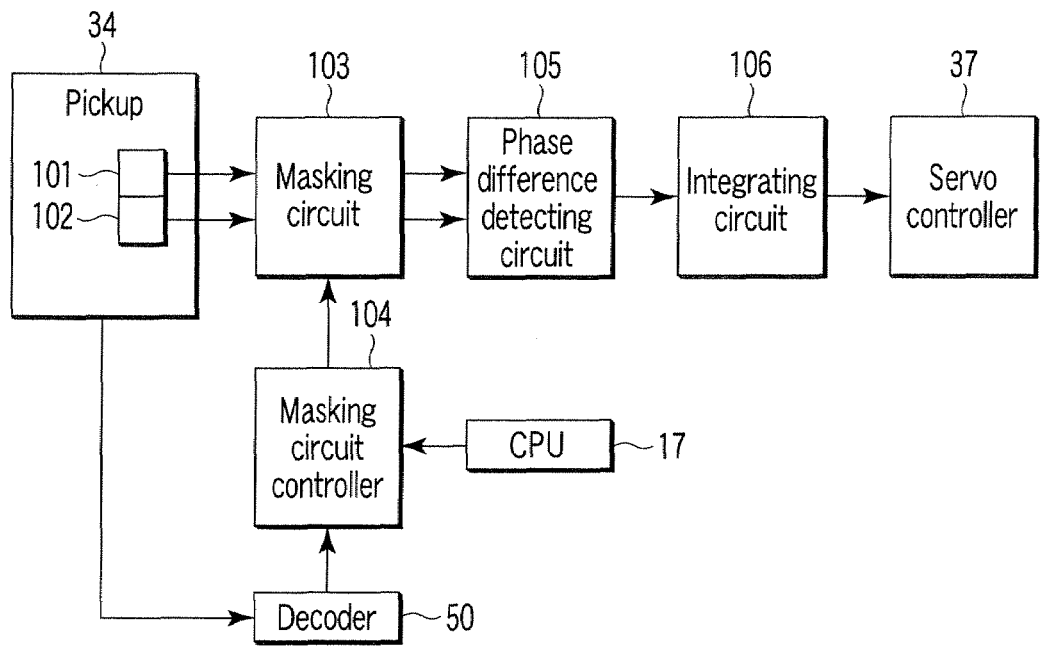
F I G. 2
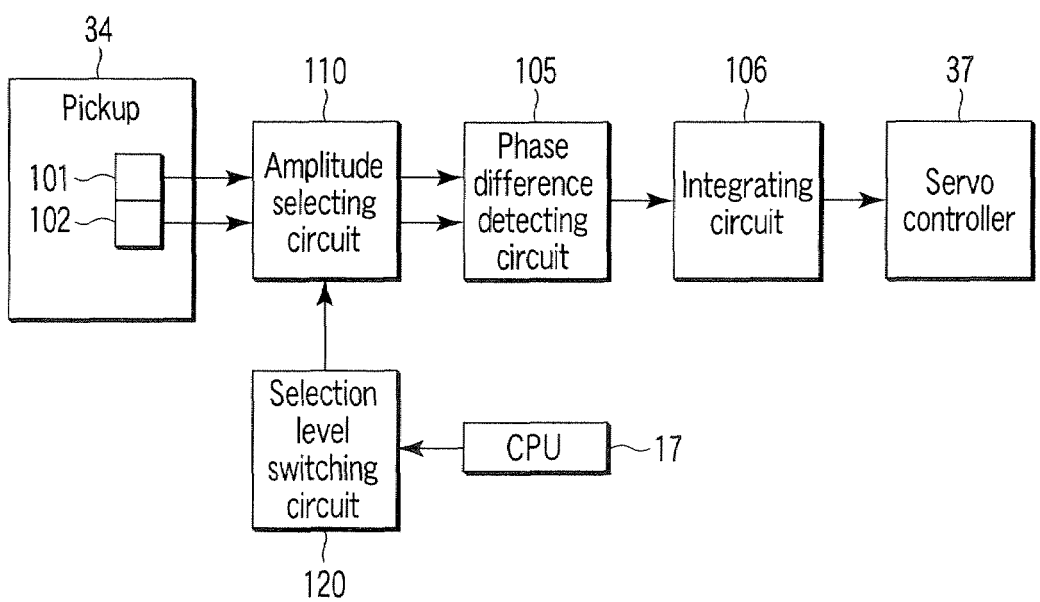
F I G. 3

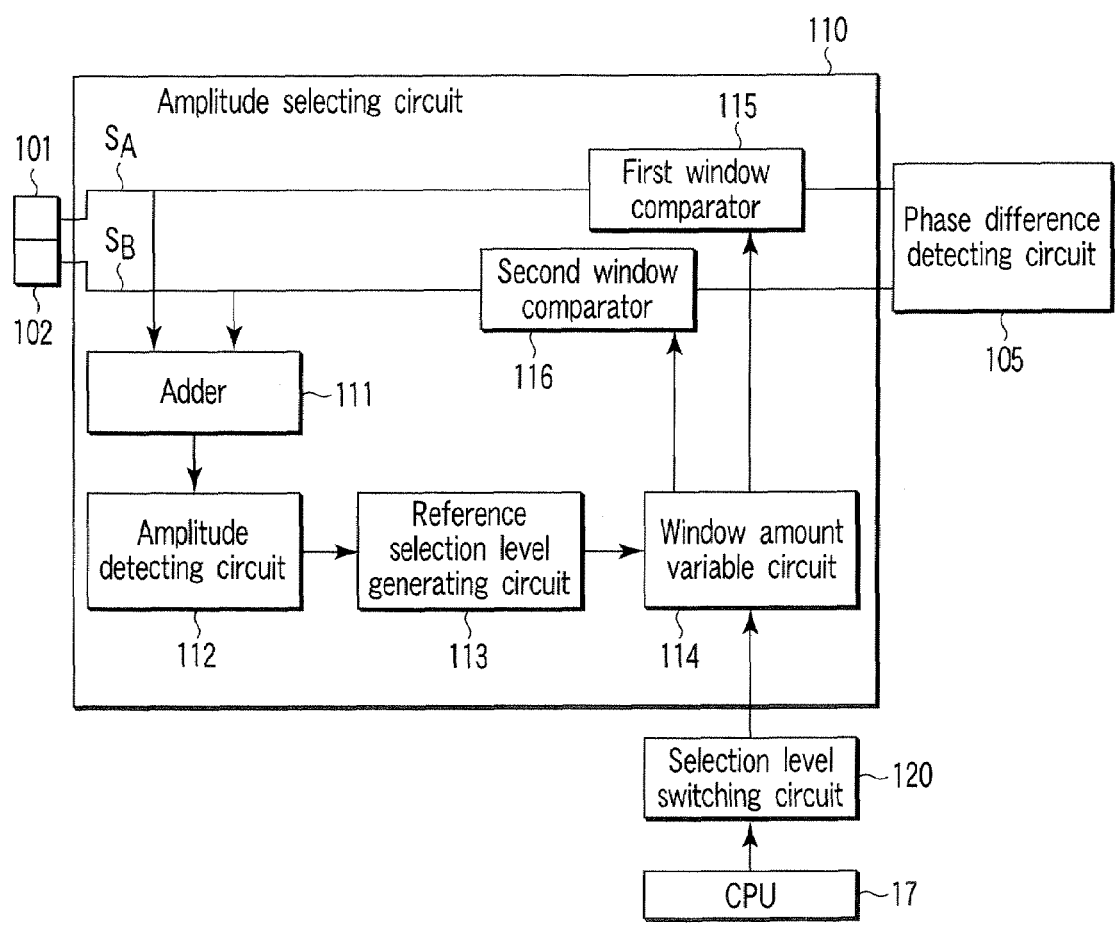
F I G. 4

OPTICAL DISC APPARATUS

CROSS-REFERENCE TO RELATED APPLICATIONS

This application is based upon and claims the benefit of priority from prior Japanese Patent Application No. 2005-269125, filed Sep. 15, 2005, the entire contents of which are incorporated herein by reference.

BACKGROUND OF THE INVENTION

1. Field of the Invention

The present invention relates to an optical disc apparatus for performing tracking control according to a phase difference between detection signals.

2. Description of the Related Art

A differential phase detection (DPD) method is employed as a tracking signal detecting method for reproducing a signal of an optical disc such as digital versatile disc (DVD) or high definition-digital versatile disc (HD DVD). This method is for detecting a temporal shift between pit positions of optical detection cells divided into the right and left of a tracking and for detecting a tracking positional shift (Jpn. Pat. Appln. KOKAI Publication No. 2005-182927).

In a next-generation optical disc, high definition digital versatile disc (HD DVD), an optical spot becomes relatively larger for a recording signal (that is, pit or mark/space) due to high density of information recording so that a degree of modulation of a mark/space signal with short time becomes smaller. Thus, it becomes difficult to detect a temporal shift of data positions between the divided light receiving cells. In other words, the shorter a data length of a recording signal is, the less a resolution of a detection signal thereof is, and a resultant phase difference signal (signal for detecting a temporal shift) in the DPD method includes more errors. Further, in a high-speed reproduction, since the faster the speed is, the smaller an absolute value of the temporal shift to be detected is, a propagation delay or relative detection delay of a detection signal occurs in a signal where a data length of a recording signal is short, and the detected phase difference signal includes more errors. Therefore, the higher the density of the optical disc is and the shorter the data length of the recording signal is, and the faster the reproduction speed is, the more difficult it is to detect a tacking positional shift.

BRIEF SUMMARY OF THE INVENTION

According to one aspect of the present invention, there is provided an optical disc apparatus which detects information recorded in a rotating optical disc by using a laser beam and reproduces data, comprising: an emitting unit which emits a laser beam to the rotating optical disc; a divided photodetector including a first dived portion and a second dived portion disposed in a light path of the reflected beam or transmitted beam from the optical record disc, and which produces a first photodetector signal and a second photodetector signal; a phase difference detector which produces a phase difference signal from a phase difference between the first photodetector signal and the second photodetector signal; an integrator which produces a integral signal from a integration of the phase difference signal; a tracking controller configure to perform tracking control based on the integral signal; and a limiter which limits a signal to be supplied from the divided photodetector to the phase difference detector or a signal to be supplied from the phase difference detector to the integrator based on a detection status of a signal detected by the dived photodetector.

BRIEF DESCRIPTION OF THE SEVERAL VIEWS OF THE DRAWING

FIG. 2 is a block diagram showing a system for detecting a tracking error of the optical disc apparatus according to the first embodiment;

FIG. 3 is a block diagram showing a system for detecting a tracking error of an optical disc apparatus according to a second embodiment; and FIG. 4 is a block diagram showing an amplitude selecting circuit of the system for detecting the tracking error shown in FIG. 3.

DETAILED DESCRIPTION OF THE INVENTION

Figure 1:
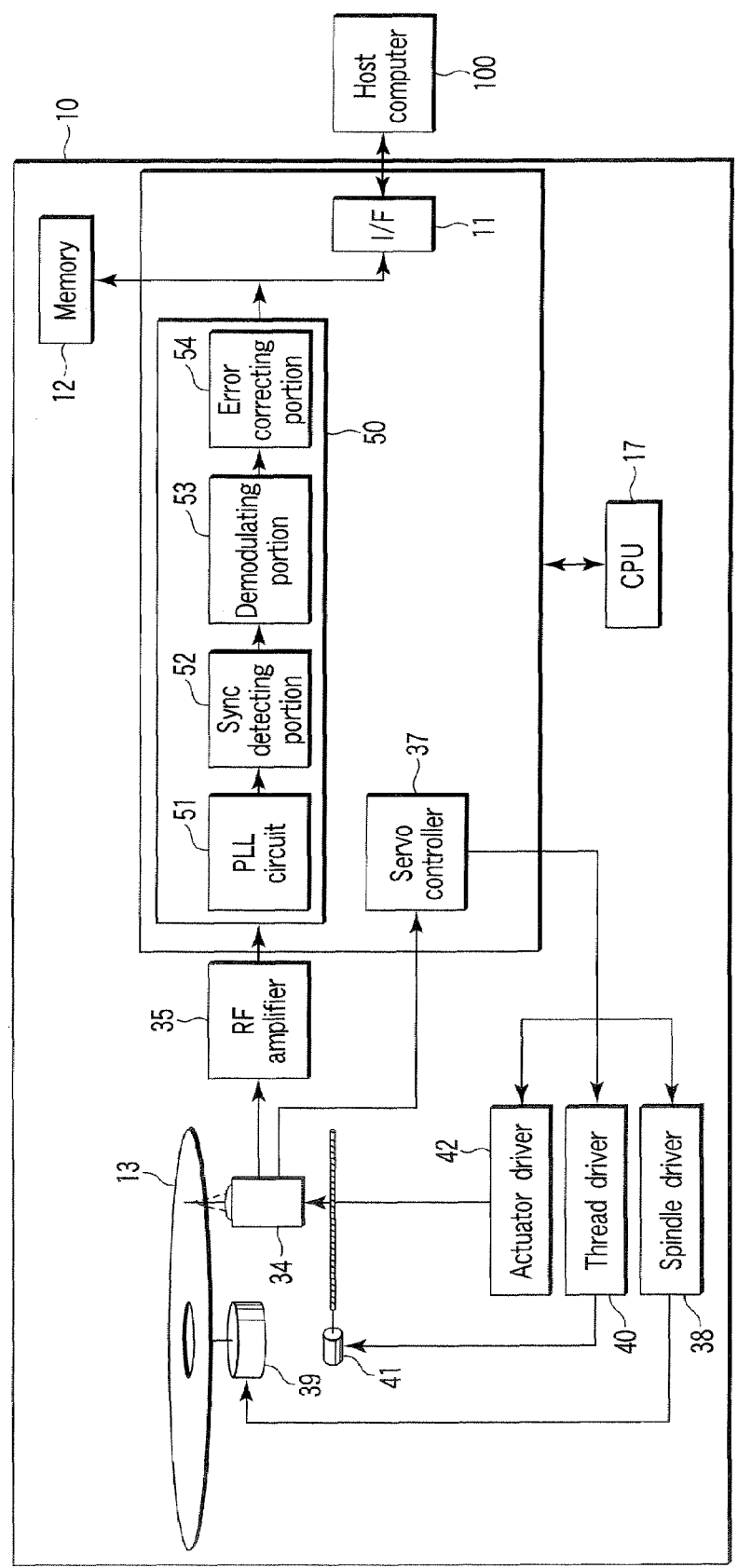
FIG. 1 is a block diagram showing a system of an optical disc apparatus according to a first embodiment.

Embodiments according to the present invention will be described below with reference to the drawing.

FIG. 1 is a block diagram showing a schematic configuration of an optical disc apparatus according to a first embodiment of the present invention.

In an optical disc apparatus 10, in emitting a light beam from an optical pickup 34, a reflected light from an optical disc 13 is incident into the optical pickup 34. The optical pickup 34 converts an optical signal into an electric signal.

The optical pickup 34 generates a servo error signal such as tracking error signal or focus error signal based on the reflected light from the optical disc 13. The servo error signal is supplied to a servo controller 37.

The servo controller 37 controls a spindle motor 39 via a spindle driver 38 based on the supplied servo error signal to rotationally drive the optical disc 13 at a predetermined speed. The servo controller 37 controls a thread motor 41 via a thread driver 40 based on the servo error signal to move a beam spot of the light beam on the optical disc 13 (hereinafter, simply referred to as a beam spot) in a radial direction of the optical disc 13 along a data track formed on the optical disc 13. Further, the servo controller 37 controls an actuator in the optical pickup 34 via an actuator driver 42 based on the servo error signal to perform tracking control and focus control.

A central processing unit (CPU) 17 drives a laser diode in the optical pickup 34 to emit a light beam toward the optical disc 13. As a result, this light beam is reflected on a recording face of the optical disc 13, and read data, which has been obtained from a reflected light thereof and read from the optical disc 13, is supplied from the optical pickup 34 to a decoder 50 via an RF amplifier 35.

The decoder 50 is configured of a phase locked loop (PLL) circuit 51, a Sync detecting portion 52, a demodulating portion 53 and an error correcting portion 54. The PLL circuit 51 extracts a clock CLK from the read data, and supplies the extracted clock CLK to the Sync detecting portion 52 together with the read data.

The Sync detecting portion 52 generates a synchronization data detecting window pulse $P_{WIN}$ with a pulse width larger by a predetermined bit than a data pattern of synchronization data $D_{SYNC}$ based on the supplied clock CLK. Then the Sync detecting portion 52 utilizes the synchronization data detecting window pulse $P_{WIN}$ to sequentially detect the synchronization data $D_{SYNC}$ from the read data and to sequentially send the read data by predetermined unit to the demodulating portion 53 based on the detection result.

The read data is subjected to demodulation processing in the demodulating portion 53, and is supplied to the error correcting portion 54. An error correction processing is performed in the error correcting portion 54 so that the data is converted into data in an original format before the recording and then is sent to a host computer 100 via an interface circuit 11 and a buffer memory 12.

In this manner, the optical disc apparatus 10 is configured so that the data recorded in the optical disc 13 can be reproduced to be sent to the host computer 100.

Next, a mechanism of generating the tracking error signal will be described. FIG. 2 shows a block diagram for generating a tracking error signal in the DPD method.

As shown in FIG. 2, respective detection signals of a first detector 101 and a second detector 102 in a 2-divided photodetector provided in the pickup (in many cases, a 4-divided or multi-divided photodetector is generally utilized, but a 2-divided photodetector is conveniently used to make explanation based on a higher conceptual view of the tracking error signal detecting) are supplied to a masking circuit 103. The 2-divided photodetector divides and detects a reflected light or transmitted light from the optical disc 13. The masking circuit 103 supplies two detection signals to a phase difference detecting circuit 105 according to a control signal from a masking circuit controller 104. The phase difference detecting circuit 105 finds a phase difference between the two supplied signals, and supplies the found result to an integrating circuit 106. The integrating circuit 106 integrates each information signal, that is, a temporal shift of each item of data of mark/space along with a servo response time, and supplies the integration result as a tracking error signal to a servo detecting circuit 37.

The information signal detected in the optical pickup 34 is supplied to the decoder 50 as data length detecting means. The decoder 50 detects a pulse length corresponding to each mark/space from the input signal, and supplies the detection result to the masking circuit controller 104. The masking circuit controller 104 is supplied with a control signal corresponding to a type of the optical disc and a reproduction speed of the optical disc from the CPU 17. The masking circuit controller 104 supplies a control signal to the masking circuit 103 such that the masking circuit 103 masks a signal whose pulse width is not more than a predetermined width and a signal whose pulse width is larger than the predetermined width is supplied from the masking circuit 103 to the phase difference detecting circuit 105.

In the case of the high-density high definition digital versatile disc (HD DVD) standard or high-speed digital versatile disc (DVD) standard, it is not necessary to detect a phase difference of all the data signals in order to detect a tracking error signal. In the DPD method, the integrating circuit 106 integrates a temporal shift of each item of data along with the servo response time. The fastest data is several hundreds times of 6 MHz/10 kHz even at the same reproduction speed in the DVD standard relative to the servo response speed.

Since the response speed of the tracking servo is generally 5 to 10 kHz due to restriction of the driving mechanism, even if the temporal shift at the short-time mark/space signal is not detected, it is possible to sufficiently detect a necessary tacking error signal.

For example, in the case of the optical disc in the DVD standard, 3 T which is the shortest pit length (or mark/space, hereinafter, "pit" collectively means these) is masked. In the case of the optical disc in the HD DVD standard, 2 T which is the shortest pit length is masked. In the case of the low-quality DVD-RW, 3 T signal is masked, or 3 T signal is masked at the high speed rotation instead of being masked at the low speed rotation. That is, one can appropriately select whether to mask depending on a signal detection status such as type of the optical disc, reproduction speed thereof or sensitivity of the pickup, and further one can arbitrarily set a data length to mask, thereby generating a tracking error signal by selectively using only a signal capable of being detected with high accuracy.

[Description of Signal Characteristics Governing Control Method]

A basis on which the above control can be performed will be described below.

A servo band of the DVD standard is about 10 KHz irrespective of the reading speed. Assuming that a phase delay on detecting is 1 deg (almost ignorable level) relative to the servo band, a sampling frequency as 360 deg/1 deg=360 times, that is, a frequency to be detected is 3.6 MHz. Assuming that a margin is 30% (3 dB), 5 MHz is assumed as a limited specification. This value is determined by the servo band, not by the rotation speed of the optical disc.

The servo band of the HD DVD standard is about 20 KHz irrespective of the reading speed. Assuming that a phase delay on detecting is 1 deg (almost ignorable level) relative to the servo band, a sampling frequency as 360 deg/1 deg=360 times, that is, a frequency to be detected is 7.2 MHz. Assuming that a margin is 30% (3 dB), 10 MHz is assumed as a limited specification. This value is determined by the servo band, not by the rotation speed of the optical disc.

An average pit length of the optical disc in the DVD standard is 4.8T. In the case of the DVD standard, a channel clock is 26.16 MHz, and a time corresponding to 1T is about 38.2 nsec. Therefore, an average sampling frequency when all the marks are detected is 5.5 MHz even at the same reproduction speed. Further, only 66% out of the entire marks can be detected except for the shortest pit length 3T. That is, the average sampling frequency except for the shortest pit length 3T is 5.5 MHz×0.66=3.6 MHz. Only 44% out of the entire marks can be detected except for 3T and 4T, and the average sampling frequency is 2.4 MHz (=5.5 MHz×0.44). Only 28% out of the entire marks can be detected except for 3 T to 5T, and the average sampling frequency is 1.5 MHz (=5.5 MHz× 0.28). Further, only 19% out of the entire marks can be detected except for 3T to 6T, and the average sampling frequency is 1 MHz (=5.5 MHz×0.19).

The average pit length of the optical disc in the HD DVD standard is 3.5T. The channel clock in the HD DVD standard is 64.8 MHz, and the time corresponding to 1T is about 15.4 nsec. Thus, the average sampling frequency when all the marks are detected is 18.5 MHz even at 1-time speed. When the shortest pit length 2T is removed from the detection signal, 63% out of the entire marks can be detected. That is, the average sampling frequency is 18.5 MHz×0.63=11.6 MHz when the shortest pit length 2T is removed form the detection signal. When 2T and 3T are removed from the detection signal, 37% out of the entire marks can be detected, and the average sampling frequency is 6.8 MHz (=18.5 MHz× 0.37). Further, when 2T to 4T are removed from the detection signal, 23% out of the entire marks can be detected, and the average sampling frequency is 4.3 MHz (=18.5 MHz×0.23). When 2T to 5T are removed from the detection signal, 8% out of the entire marks can be detected, and the average sampling frequency is 1.5 MHz (=18.5 MHz×0.19).

When the reading speed is increased, the average sampling frequency is also increased. In the case of the DVD standard, the sampling frequency corresponding to a combination of the pit length to be sampled and the reading speed is shown in Table 1.

TABLE 1

|      | ×1      | ×2      | ×3       | ×4       | ×8       |
|------|---------|---------|----------|----------|----------|
| 3T - | 5.5 MHz | 11 MHz  | 16.4 MHz | 21.8 MHz | 43.6 MHz |
| 4T - | 3.6 MHz | 7.2 MHz | 10.8 MHz | 14.4 MHz | 28.8 MHz |
| 5T - | 2.4 MHz | 4.8 MHz | 7.2 MHz  | 9.6 MHz  | 19.2 MHz |
| 6T - | 1.5 MHz | 3.1 MHz | 4.6 MHz  | 6.1 MHz  | 12.2 MHz |
| 7T - | 1 MHz   | 2.1 MHz | 3.1 MHz  | 4.1 MHz  | 8.3 MHz  |

Similarly in the HD DVD standard, the sampling frequency corresponding to a combination of the pit length to be sampled and the reading speed is shown in Table 2.

TABLE 2

|      | ×1       | ×2       | ×3       | ×4       | ×8       |
|------|----------|----------|----------|----------|----------|
| 2T - | 18.5 MHz | 37 MHz   | 16.4 MHz | 21.8 MHz | 43.6 MHz |
| 3T - | 11.7 MHz | 23.3 MHz | 35 MHz   | 46.7 MHz | 93.3 MHz |
| 4T - | 6.9 MHz  | 13.7 MHz | 20.6 MHz | 27.4 MHz | 54.8 MHz |
| 5T - | 4.3 MHz  | 8.5 MHz  | 12.8 MHz | 17 MHz   | 34.1 MHz |
| 6T - | 1.5 MHz  | 3 MHz    | 4.4 MHz  | 5.9 MHz  | 11.8 MHz |

As described above, the sampling frequency required for servo control is 5 MHz in the DVD standard and 10 MHz in the HD DVD standard. The sampling frequency required for the optical disc in the DVD standard and the optical disc in the HD DVD standard, and the condition of the signal length in the DVD standard and the HD DVD standard to be at least detected from Table 1 and Table 2 are shown in Table 3.

TABLE 3

|     | DVD  | HD DVD |
|-----|------|--------|
| ×1  | 3T - | 3T -   |
| ×2  | 4T - | 4T -   |
| ×3  | 5T - | 5T -   |
| ×4  | 6T - | 5T -   |
| ×8  | 7T - | 6T -   |

It is naturally better to detect with high accuracy in terms of the system. From the pit size and the beam spot size, 100% of the amplitude can be detected in the pit of the data length of 6T or more in the DVD standard (7T or more in the HD DVD standard) in principle, and thus the pit of 5T in the DVD standard (6T in the HD DVD standard) can be always detected.

Second Embodiment

The above embodiment has limited a signal to be used in measuring a data length and generating a tracking error signal depending on the data length. In the present embodiment, a DPD detection signal to be used in generating a tracking error signal is limited depending on an amplitude of an addition signal which is added with an AC component of each DPD detection signal obtained from the two photodetectors.

Along with high density, the size of the reading beam in the short pit signal is larger than that of the pit, which causes interference, and a signal amplitude to be detected becomes smaller than that of the long pit signal. For example, the 3T signal obtained from the optical disc in the DVD standard has about 20% of the amplitude, the 2T signal obtained from the optical disc in the HD DVD standard has less than several % thereof, and the 3T signal has about 30% thereof. Signals to be used for phase difference detection in the DPD method are limited to signals having an amplitude at a certain level or more, and the signals less than the level are masked. The masking level can be selected depending on a signal detection status such as type of the optical disc, reproduction speed thereof, or sensitivity of the pickup.

A system for generating a tracking error signal will be described using FIG. 3. FIG. 3 is a block diagram showing a system for generating a tracking error signal according to the second embodiment.

As shown in FIG. 3, an amplitude selecting circuit 110 is provided between a first detector 101 and a second detector 102, both of which constitute the 2-divided photodetector, and a phase difference detecting circuit 105. The amplitude selecting circuit 110 is supplied with a selection level switching signal from a selection level switching circuit 120. The amplitude selecting circuit 110 limits a DPD detection signal to be supplied from the first detector 101 and the second detector 102 to the phase difference detecting circuit 105 depending on the selection level switching signal.

A structure of the amplitude selecting circuit 110 will be described using FIG. 4.

After AC-coupling the DPD detection signal and extracting the AC component of the DPD detection signal, an adder 111 adds the extracted signal to generate an addition signal, and supplies it to an amplitude detecting circuit 112. The amplitude detecting circuit 112 detects an amplitude of the addition signal, and supplies the detection result to a reference selection level selecting circuit 113. The reference selection level selecting circuit 113 generates a reference value of the window amount for digitalizing based on the detected amplitude, and supplies the reference value to a window amount variable circuit 114.

The selection level switching circuit 120 determines the window amount (to detect from what % or more out of the input signals) depending on information such as rotation speed of the optical disc and radius position thereof, which are supplied from the CPU 17, that is, depending on information corresponding to the reproduction speed, and supplies the selection level switching signal according to the determined window amount to the window amount variable circuit 114.

The window amount variable circuit 114 sets the window amount depending on the reference value supplied from the reference selection level selecting circuit 113 and the control signal supplied from the selection level switching circuit 120, and supplies the set value to a first window comparator 115 and a second window comparator 116. The first window comparator 115 and the second window comparator 116 limit the DPD detection signal to be input into the phase difference detecting circuit 105 depending on the set value.

Here, since when the data length of the pit is longer, the amplitude becomes larger, the detection accuracy is almost identical to that described in the first embodiment. In the first embodiment, an accuracy of detecting the data length is not sufficient for a signal having a short data length. On the contrary, in the present embodiment, since there is a limitation so that the amplitude of the DPD detection signal itself is detected and a signal with high accuracy is used, the accuracy of limiting the signal can be easily increased as compared with the first embodiment.

As described above, according to the aforementioned first and second embodiments, a signal having a short data length, which includes much error component, is masked as the signal for tracking error detection, and is not used for tracking error detection, thereby improving the accuracy of the tracking control. A trend in which the signal having a short data length includes an error component further increases when the optical disc becomes high-density and the data length of the recording signal becomes shorter and when the reproduction speed becomes faster, and thus the present invention becomes more effective. Further, it is possible to appropriately select whether to mask depending on the signal detection status such as type of the optical disc, reproduction speed thereof or sensitivity of the pickup, and further to arbitrarily set a signal to be masked, thereby generating a tracking error signal by selectively using only a signal capable of being detected with high accuracy.

The first and second embodiments are configured to limit a signal to be supplied from the divided photodetector to the phase difference detecting circuit, but they may use the same signal detecting method respectively, that is, the data length detecting in the first embodiment or the amplitude detecting in the second embodiment so as to limit a signal, which corresponds to a signal to be masked, to be supplied from the phase difference detecting circuit to the integrating circuit. Also by doing so, similarly as in the first and second embodiments, a signal having a short data length, which includes much error component, is not finally used for generating a tracking error signal, thereby improving the accuracy of the tracking control.

The technique described in the first and second embodiments can be applied to detect a tracking error in various optical discs in Blue-ray standard and the like other than the DVD standard and the HD DVD standard.

The present invention is not limited to the above embodiments, and may modify and embody constituents without departing from the spirit thereof in practical stage. Further, appropriate combinations of several constituents disclosed in the above embodiments can form various inventions. For example, several constituents may be deleted from all the constituents shown in the embodiments. Furthermore, constituents over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc apparatus which detects information recorded in a rotating optical disc by using a laser beam and reproduces data, comprising:

an emitting unit configured to emit a laser beam to the rotating optical disc;

a divided photodetector including a first divided portion and a second divided portion disposed in a light path of the reflected beam or transmitted beam from the optical record disc, the first divided portion outputs a first photodetector signal, and the second divided portion outputs a second photodetector signal;

a phase difference detector configured to produce a phase difference signal from a phase difference between the first photodetector signal and the second photodetector signal;

an integrator configured to produce a integral signal from a integration of the phase difference signal detected by the phase difference detector;

a tracking controller configured to perform tracking control of the emitting unit based on the integral signal outputted form the integrator;

a data length detector configured to detect a data length corresponding to a pit or mark/space of an information signal obtained from the optical disc;

a setting unit configured to set the data length to be detected based on the reproduction speed of the optical disc and the type of the optical disc, that a minimum average sampling frequency to be obtained will be higher than a sampling frequency required for the given optical disc; and a limiter configured to limit one or both of the first and second photodetector signals to be supplied from the divided photodetector to the phase difference detector or the phase difference signal to be supplied from the phase difference detector to the integrator when the data length detected by the data length detector is not more than the minimum data length for limiting set by the setting unit.

2. The optical disc apparatus according to claim 1, wherein the setting unit sets a first data length when a reproduction speed of the optical disc is faster than a predetermined speed, and sets a second data length shorter than the first data length or does not set a data length when it is slower than the predetermined speed.

3. The optical disc apparatus according to claim 1, wherein the setting unit sets a first data length when a type of the optical disc is a first type, and sets a second data length or does not set a data length when a type of the optical disc is a second type in which recording density is lower than that of the optical disc of the first type.

* * * * *